(12) United States Patent
Hsia et al.

(10) Patent No.: US 11,946,626 B2
(45) Date of Patent: Apr. 2, 2024

(54) LIGHT-EMITTING DIODE LAMPS WITH BATTERY BACKUP USER INTERFACES

(71) Applicant: Aleddra Inc., Renton, WA (US)

(72) Inventors: Chungho Hsia, Bellevue, WA (US); Chia-Yiu Maa, Bellevue, WA (US); Chun-Te Yu, Bellevue, WA (US)

(73) Assignee: Aleddra Inc., Renton, WA (US)

( * ) Notice: Subject to any disclaimer, the term of this patent is extended or adjusted under 35 U.S.C. 154(b) by 216 days.

(21) Appl. No.: 17/696,780

(22) Filed: Mar. 16, 2022

(65) Prior Publication Data

US 2022/0205597 A1 Jun. 30, 2022

Related U.S. Application Data

(63) Continuation-in-part of application No. 17/405,203, filed on Aug. 18, 2021, now Pat. No. 11,283,291, which is a continuation-in-part of application No. 17/329,018, filed on May 24, 2021, now Pat. No. 11,303,151, which is a continuation-in-part of application No. 17/313,988, filed on May 6, 2021, now Pat. No. 11,264,831, which is a continuation-in-part of application No. 17/213,519, filed on Mar. 26, 2021, now Pat. No. 11,271,422, which is a continuation-in-part of application No. 17/151,606, filed on Jan. 18, 2021, now Pat. No. 11,259,386, which is a continuation-in-part of application No. 17/122,942, filed on Dec. 15, 2020, now Pat. No. 11,265,991, which is a continuation-in-part of application No. 17/099,450,
(Continued)

(51) Int. Cl.
H05B 45/37 (2020.01)
F21V 23/00 (2015.01)
H02J 1/10 (2006.01)
F21Y 115/10 (2016.01)

(52) U.S. Cl.
CPC ............. *F21V 23/003* (2013.01); *H02J 1/10* (2013.01); *F21Y 2115/10* (2016.08)

(58) Field of Classification Search
CPC ........ H05B 45/30; H05B 45/37; H05B 45/40; H05B 47/10; H02J 1/10; F21V 23/003; F21Y 2115/10
See application file for complete search history.

(56) References Cited

U.S. PATENT DOCUMENTS

2010/0045187 A1* 2/2010 Shteynberg ............ H05B 45/56
315/210

* cited by examiner

Primary Examiner — Jimmy T Vu
(74) Attorney, Agent, or Firm — Han IP PLLC; Andy M. Han

(57) ABSTRACT

An LED lamp includes an elongated housing, LED arrays, a rechargeable battery, a controller circuit, two drivers, a charging circuit, and a battery backup user interface. The first driver converts an external power to drive the LED array whereas the second driver draws power from the rechargeable battery to drive the LED arrays during power outage. The charging circuit charges the rechargeable battery during normal operation. The battery backup user interface includes a battery charging indicator indicating the charging status of the rechargeable battery. The battery backup user interface also includes a battery shutoff switch configured to allow a user to enable or disable the rechargeable battery. In some cases, the battery backup user interface further includes a test button configured to allow the user to trigger a test of the rechargeable battery.

24 Claims, 4 Drawing Sheets

Related U.S. Application Data filed on Nov. 16, 2020, now Pat. No. 11,264,830, which is a continuation-in-part of application No. 17/076,748, filed on Oct. 21, 2020, now Pat. No. 11,271,388, which is a continuation-in-part of application No. 17/026,903, filed on Sep. 21, 2020, now Pat. No. 11,271,421, which is a continuation-in-part of application No. 17/016,296, filed on Sep. 9, 2020, now Pat. No. 11,259,374, which is a continuation-in-part of application No. 16/989,016, filed on Aug. 10, 2020, now Pat. No. 11,122,658, which is a continuation-in-part of application No. 16/929,540, filed on Jul. 15, 2020, now Pat. No. 11,116,057, which is a continuation-in-part of application No. 16/904,206, filed on Jun. 17, 2020, now Pat. No. 11,102,864, which is a continuation-in-part of application No. 16/880,375, filed on May 21, 2020, now Pat. No. 11,172,551, which is a continuation-in-part of application No. 16/861,137, filed on Apr. 28, 2020, now Pat. No. 10,992,161, which is a continuation-in-part of application No. 16/830,198, filed on Mar. 25, 2020, now Pat. No. 10,869,373, which is a continuation-in-part of application No. 16/735,410, filed on Jan. 6, 2020, now Pat. No. 10,660,179, which is a continuation-in-part of application No. 16/694,970, filed on Nov. 25, 2019, now Pat. No. 10,602,597, which is a continuation-in-part of application No. 16/681,740, filed on Nov. 12, 2019, now Pat. No. 10,959,310, which is a continuation-in-part of application No. 16/664,034, filed on Oct. 25, 2019, now Pat. No. 10,660,184, which is a continuation-in-part of application No. 16/572,040, filed on Sep. 16, 2019, now Pat. No. 10,645,782, which is a continuation-in-part of application No. 16/547,502, filed on Aug. 21, 2019, now Pat. No. 10,485,073, which is a continuation-in-part of application No. 16/530,747, filed on Aug. 2, 2019, now Pat. No. 10,492,265, which is a continuation-in-part of application No. 16/458,823, filed on Jul. 1, 2019, now Pat. No. 10,485,065, which is a continuation-in-part of application No. 16/432,735, filed on Jun. 5, 2019, now Pat. No. 10,390,396, which is a continuation-in-part of application No. 16/401,849, filed on May 2, 2019, now Pat. No. 10,390,395, which is a continuation-in-part of application No. 16/296,864, filed on Mar. 8, 2019, now Pat. No. 10,390,394, which is a continuation-in-part of application No. 16/269,510, filed on Feb. 6, 2019, now Pat. No. 10,314,123, which is a continuation-in-part of application No. 16/247,456, filed on Jan. 14, 2019, now Pat. No. 10,327,298, which is a continuation-in-part of application No. 16/208,510, filed on Dec. 3, 2018, now Pat. No. 10,237,946, which is a continuation-in-part of application No. 16/154,707, filed on Oct. 8, 2018, now Pat. No. 10,225,905, which is a continuation-in-part of application No. 15/947,631, filed on Apr. 6, 2018, now Pat. No. 10,123,388, which is a continuation-in-part of application No. 15/911,086, filed on Mar. 3, 2018, now Pat. No. 10,136,483, which is a continuation-in-part of application No. 15/897,106, filed on Feb. 14, 2018, now Pat. No. 10,161,616, which is a continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

LIGHT-EMITTING DIODE LAMPS WITH BATTERY BACKUP USER INTERFACES

CROSS-REFERENCE TO RELATED APPLICATIONS

The present disclosure is part of a continuation-in-part (CIP) application of U.S. patent application Ser. No. 17/405,203, filed 18 Aug. 2021 and issued as U.S. Pat. No. 11,283,291 on 22 Mar. 2022, which is part of CIP application of U.S. patent application Ser. No. 17/329,018, filed 24 May 2021, which is part of CIP application of U.S. patent application Ser. No. 17/313,988, filed 6 May 2021 and issued as U.S. Pat. No. 11,264,831 on 1 Mar. 2022, which is part of CIP application of U.S. patent application Ser. No. 17/213,519, filed 26 Mar. 2021 and issued as U.S. Pat. No. 11,271,422 on 8 Mar. 2022, which is part of CIP application of U.S. patent application Ser. No. 17/151,606, filed 18 Jan. 2021 and issued as U.S. Pat. No. 11,259,386 on 22 Feb. 2022, which is part of CIP application of U.S. patent application Ser. No. 17/122,942, filed 15 Dec. 2020 and issued as U.S. Pat. No. 11,265,991 on 1 Mar. 2022, which is part of CIP application of U.S. patent application Ser. No. 17/099,450, filed 16 Nov. 2020 and issued as U.S. Pat. No. 11,264,830 on 1 Mar. 2022, which is part of CIP application of U.S. patent application Ser. No. 17/076,748, filed 21 Oct. 2020 and issued as U.S. Pat. No. 11,271,388 on 8 Mar. 2022, which is part of CIP application of U.S. patent application Ser. No. 17/026,903, filed 21 Sep. 2020 and issued as U.S. Pat. No. 11,271,421 on 8 Mar. 2022, which is part of CIP application of U.S. patent application Ser. No. 17/016,296, filed 9 Sep. 2020 and issued as U.S. Pat. No. 11,259,374 on 22 Feb. 2022, which is part of CIP application of U.S. patent application Ser. No. 16/989,016, filed 10 Aug. 2020 and issued as U.S. Pat. No. 11,122,658 on 14 Sep. 2021, which is part of CIP application of U.S. patent application Ser. No. 16/929,540, filed 15 Jul. 2020 and issued as U.S. Pat. No. 11,116,057 on 7 Sep. 2021, which is part of CIP application of U.S. patent application Ser. No. 16/904,206, filed 17 Jun. 2020 and issued as U.S. Pat. No. 11,102,864 on 24 Aug. 2021, which is part of CIP application of U.S. patent application Ser. No. 16/880,375, filed 21 May 2020 and issued as U.S. Pat. No. 11,172,551 on 9 Nov. 2021, which is part of CIP application of U.S. patent application Ser. No. 16/861,137, filed 28 Apr. 2020 and issued as U.S. Pat. No. 10,992,161 on 27 Apr. 2021, which is part of CIP application of U.S. patent application Ser. No. 16/830,198, filed 25 Mar. 2020 and issued as U.S. Pat. No. 10,869,373 on 15 Dec. 2020, which is part of CIP application of U.S. patent application Ser. No. 16/735,410, filed 6 Jan. 2020 and issued as U.S. Pat. No. 10,660,179 on 19 May 2020, which is part of CIP application of U.S. patent application Ser. No. 16/694,970, filed 25 Nov. 2019 and issued as U.S. Pat. No. 10,602,597 on 24 Mar. 2020, which is part of CIP application of U.S. patent application Ser. No. 16/681,740, filed 12 Nov. 2019 and issued as U.S. Pat. No. 10,959,310 on 23 Mar. 2021, which is part of CIP application of U.S. patent application Ser. No. 16/664,034, filed 25 Oct. 2019 and issued as U.S. Pat. No. 10,660,184 on 19 May 2020, which is part of CIP application of U.S. patent application Ser. No. 16/572,040, filed 16 Sep. 2019 and issued as U.S. Pat. No. 10,645,782 on 5 May 2020, which is part of CIP application of U.S. patent application Ser. No. 16/547,502, filed 21 Aug. 2019 and issued as U.S. Pat. No. 10,485,073 on 19 Nov. 2019, which is part of CIP application of U.S. patent application Ser. No. 16/530,747, filed 2 Aug. 2019 and issued as U.S. Pat. No. 10,492,265 on 26 Nov. 2019, which is part of CIP application of U.S. patent application Ser. No. 16/458,823, filed 1 Jul. 2019 and issued as U.S. Pat. No. 10,485,065 on 19 Nov. 2019, which is part of CIP application of U.S. patent application Ser. No. 16/432,735, filed 5 Jun. 2019 and issued as U.S. Pat. No. 10,390,396 on 20 Aug. 2019, which is part of CIP application of U.S. patent application Ser. No. 16/401,849, filed 2 May 2019 and issued as U.S. Pat. No. 10,390,395 on 20 Aug. 2019, which is part of CIP application of U.S. patent application Ser. No. 16/296,864, filed 8 Mar. 2019 and issued as U.S. Pat. No. 10,390,394 on 20 Aug. 2019, which is part of CIP application of U.S. patent application Ser. No. 16/269,510, filed 6 Feb. 2019 and issued as U.S. Pat. No. 10,314,123 on 4 Jun. 2019, which is part of CIP application of U.S. patent application Ser. No. 16/247,456, filed 14 Jan. 2019 and issued as U.S. Pat. No. 10,327,298 on 18 Jun. 2019, which is part of CIP application of U.S. patent application Ser. No. 16/208,510, filed 3 Dec. 2018 and issued as U.S. Pat. No. 10,237,946 on 19 Mar. 2019, which is part of CIP application of U.S. patent application Ser. No. 16/154,707, filed 8 Oct. 2018 and issued as U.S. Pat. No. 10,225,905 on 5 Mar. 2019, which is part of a CIP application of U.S. patent application Ser. No. 15/947,631, filed 6 Apr. 2018 and issued as U.S. Pat. No. 10,123,388 on 6 Nov. 2018, which is part of a CIP application of U.S. patent application Ser. No. 15/911,086, filed 3 Mar. 2018 and issued as U.S. Pat. No. 10,136,483 on 20 Nov. 2018, which is part of a CIP application of U.S. patent application Ser. No. 15/897,106, filed 14 Feb. 2018 and issued as U.S. Pat. No. 10,161,616 on 25 Dec. 2018, which is a CIP application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure pertains to elongated light-emitting diode (LED) lamps and, more specially, proposes an elongated LED lamp with battery backup user interfaces.

Description of Related Art

With the availability of the linear T8 and T5 LED lamps at affordable prices and energy savings, more and more linear fluorescent T8/T5 lamps are being replaced LED T8/T5 lamps. However, these LED T8/T5 lamps are not compatible with the fluorescent emergency ballasts that were used to provide emergency power to the fluorescent T8/T5 lamps due to two key technical incompatibilities. Firstly, when an emergency ballast begins to power a fluorescent T8/T5 lamp, it raises its output voltage to 400-600 volt in order to activate the mercury plasma inside the fluorescent lamp. The initial voltage surge of the emergency ballast is not expected by most LED T8/T5 lamp drivers. The voltage surge may overheat the LED lamp driver and cause it to catch fire. Secondly, once the mercury plasma in the fluorescent T8/T5 lamp is activated, the emergency ballast drops its power supply to one third or one quarter to keep the fluorescent T8/T5 lamp partially lit. Such partial power supply is not expected by most LED T8/T5 lamp drivers either. As a result, the LED T8/T5 lamps can't be used safely with the emergency ballasts that were designed for fluorescent T8/T5 lamps.

The present disclosure introduces an elongated LED lamp with a rechargeable battery and more importantly a battery backup user interface that can greatly enhance the usability of the emergency lighting functionality of the lamp.

SUMMARY

In one aspect, the elongated LED lamp comprises an elongated housing, one or more LED arrays disposed inside the elongated housing facing a first direction, a rechargeable battery disposed inside the housing, a controller circuit disposed inside the housing, a first driver disposed inside the housing and configured to convert a first external power to a first internal power for driving the LED array, a charging circuit disposed inside the housing and configured to convert a second non-switched (always-on) external power to a second internal power for charging the rechargeable battery, a second driver disposed inside the housing and configured to draw a third internal power from the rechargeable battery and convert the third internal power to a fourth internal power for driving the LED array, a portion of the elongated housing comprising an elongated translucent or transparent lens for the light of the LED array to shine through, and a user interface section disposed on an opaque portion of the elongated housing and facing the same first direction as the LED array. Note that the distinction between the first driver and the second driver is functional, not necessarily physical. It is possible to design an embodiment where the first driver and the second driver are implemented via one physical driver, and yet the wattage of the first internal power and the wattage of the fourth internal power may differ. For example, the first internal power supplies 15 W to the LED array, whereas the fourth internal power supplies 3 W emergency power to the LED array.

When the controller circuit detects the second external power is on, the controller circuit is configured to operate the LED lamp in a normal mode by (1) enabling the charging circuit for charging the rechargeable battery, (2) disabling the second driver from drawing the third internal power from the rechargeable battery, and (3) enabling the first driver supplying the first internal power to light up the LED array. When the controller circuit detects the second external power is off and the first external power is also off (i.e., in the event of a power outage), the controller circuit is configured to operate the LED lamp in an emergency mode by enabling the second driver for drawing the third internal power from the rechargeable battery and supplying the fourth internal power to light up the LED array.

The user interface section comprises a first indicator indicating whether the rechargeable battery is being charged or not, and a battery shutoff mechanism for disabling the rechargeable battery from providing the third internal power to the second driver.

In some embodiments, the first external power and the second external power are the same non-switched power source. In which case, in the normal mode, the first driver and the second driver receive the same constant-on power supply. With these embodiments, the LED lamp is suitable for always-on lighting applications where the LED lamp remains on 24×7. Under these lighting applications, the LED lamp is not meant to be turned off by a user at night because switching off the power to the LED lamp will be viewed as a power outage by the controller circuit, causing the second driver to draw power from the rechargeable battery.

In some embodiments, the LED lamp connects to the same non-switched power source through a pair of electrical contacts extruding out of one end of the elongated housing. If the embodiment of the LED lamps has one pair of electrical contacts on each of its two ends of the elongated housing, only one pair of the electrical contacts are connected to the non-switched power source. The other pair of electrical contacts are not connected to any power source. This type of wiring is also known as single-end wiring style since only one end of the lamp is wired to an external power.

In some embodiments, the lamp connects to the same non-switched power source through a first electrical contact extruding out of one end of the elongated housing and a second electrical contact extruding out of the opposite end of the elongated housing. With T5 HO base, there is only one electrical pin at each of the two ends of the elongated housing. With a G13 or G5 bi-pin base, the embodiment of the LED lamps has one pair of electrical contacts on each of the two ends of the elongated housing. In which case, only one of the two electrical contacts on each end of the elongated housing is required to connect to the non-switched power source. It is possible to bridge the two electrical contacts on each end of the elongated housing such that it doesn't matter which of the two electrical contacts out of one end of the elongated housing is used since the two electrical contacts are electrically connected.

In some embodiments, the first external power is a switched external power. Under these embodiments, the lamp connects to the first switched external power though a first pair of electrical contacts extruding out of one end of the elongated housing, and the lamp connects to the second non-switched external power through a second pair of electrical contacts extruding out of the opposite end of the elongated housing. With these embodiments, the switched external power may be turned on and off without affecting the charging of the rechargeable battery from the non-switched external power via the charging circuit.

The first indicator on the user interface section displays the charging status of the rechargeable battery. It may or may not tell the difference when the battery is being charge or the battery is fully charged. In some embodiments, the user interface section further comprises a second indicator for indicating whether the rechargeable battery is fully charged or not. The distinction between the first indicator and the second indicator is logical, not physical. They may be implemented via one physical indicator, where the indicator may flash when the rechargeable battery is being charged and stop flashing when the rechargeable battery is fully charged. Alternatively, the one physical indicator may show one color (e.g., red) when the rechargeable battery is being charged, and a different color (e.g., green) when the rechargeable battery is fully charged.

There are different means to implement the battery shutoff mechanism. In some embodiments, the battery shutoff mechanism is a mechanical switch. When a mechanical shutoff switch is depressed, an electrical connection between the rechargeable battery and the second driver is off.

In some embodiments, the lamp further comprises a voltage sensing circuit for sensing the terminal voltage of the rechargeable battery and a user interface section further comprising a test button and a third indicator. When the test button is depressed, the controller circuit is configured to operate the LED lamp in a battery test mode for a first predefined period (e.g., 3 seconds or 30 seconds) by: (1) disabling the first driver from supplying the first internal power to the LED array, (2) disabling the charging circuit from providing the second internal power to the rechargeable battery, (3) enabling the second driver drawing the third internal power from the rechargeable battery, (4) enabling the second driver supplying the fourth internal power to light up the LED array, and (5) sampling the terminal voltage of the rechargeable battery via the voltage sensing circuit. If the terminal voltage of the rechargeable battery drops below a predefined percentage (e.g., 70%) relative to a nominal voltage during the battery test mode, the controller circuit sets off the third indicator (indicating the battery test failed), exits out of the battery test mode, and resumes the normal mode operation of the lamp. The third indicator may be implemented by using a dedicated indicator light. Alternatively, it may be implemented by flickering the first indicator at a faster speed, such every 0.5 second, to notify the user that the battery test has failed.

It may be desirable to support more than one predefined period to meet the emergency safety regulations. For example, the UL 924 emergency light standards call for a 30-second battery test to be performed monthly and a 90-min battery test to be performed annually. Therefore, in some embodiments, the user interface supports a mechanism to trigger the controller circuit to perform the battery test mode for a second predefined period (e.g., 90 minutes) which is longer than the first predefined period. Further in some embodiments, the mechanism to trigger the controller circuit to perform the battery test for a second predefined period comprises depressing the test button twice in two seconds. This affords to use the same test button for multiple operations, thus saving the real estate on the user interface section.

In some embodiments, the user interface section further comprises a fourth indicator indicating the lamp is operating in the battery test mode. This may be implemented via a dedicated indicator light. Alternatively, this may be implemented by flashing the first indicator at a slow speed, e.g., every 2 seconds, to notify a user the lamp is performing a batter test. Using the same first indicator for more than one purposes saves the real estate on the user interface section, thus enhancing the usability of the user interface section.

In some embodiments, the controller circuit further comprises a memory portion storing most recent battery test results (e.g., passed or failed). Further in some embodiments, the memory portion comprises a flash memory. In some embodiments, the controller circuit further comprises a memory-used battery. When the memory-used battery is used, the most recent battery test results will not be lost even when the rechargeable battery is completed drained.

In some embodiments, the controller circuit further comprises a second rechargeable battery to power the operation of the controller circuit during the battery test mode and/or during power outage when the first external power and the second external power are off. With the second rechargeable battery, the controller circuit can still operate even when the rechargeable battery is completed drained.

In some embodiments, the controller circuit is configured to perform the battery test mode periodically and automatically based on at least one predefined schedule and an internal clock in the controller circuit. For example, one schedule is to perform a 30-sec battery test every 30 days and another schedule to perform a 90-min battery test every 365 days. The battery testing schedule may start immediately after the lamp is installed, or it may start 48 hours after the installation to prevent a premature start of the testing schedule.

In some embodiments, the controller circuit comprises a mechanism to reset the starting time of the battery test schedule. This feature is useful because without this feature, the controller circuit may start the battery test mode at 9 am, because it was installed and turned on at 9 am. For a surgery room when this lamp is installed, a battery test of the lamp at 9 am when a surgery is going on would be disastrous. It would be necessary to reset the battery test to say 12 am, so no surgical operations will be affected by the battery test of the lamp. In some embodiments, the mechanism for resetting the starting time of the battery test schedule for the controller circuit comprises depressing the test button three times in two seconds. Again, using the same test button for one more function saves the real estate of the user interface section.

In some embodiments, the lamp further comprises a network interface portion working in conjunction with the controller circuit for either (1) reporting the most recent results of the battery test mode to a remote device or system, or (2) receiving and executing a battery test mode request from a remote device or system and reporting the result of the battery test mode back to the remote device or system, or (3) both. The network interface portion makes the batter backup function of the LED lamp remotely manageable. This feature would give a building manager a greater controllability and visibility over the battery backup functions and conditions of the LED lamp.

In some embodiments, the network interface portion communicates via a wireless communication such as but not limited to Wi-Fi, Bluetooth, infrared (IR) or visible light communication (VLC). In some other embodiments, the network interface portion communicates via a wired communication such as such as but not limited to Power over Ethernet (POE).

There are different implementation choices for the controller circuit. In some embodiments, the controller circuit comprises a microprocessor or a microcontroller circuit, thus providing a greater programmable flexibility to the controller circuit and its functionality.

BRIEF DESCRIPTION OF THE DRAWINGS

The accompanying drawings are included to aid further understanding of the present disclosure, and are incorporated in and constitute a part of the present disclosure. The drawings illustrate a select number of embodiments of the present disclosure and, together with the detailed description below, serve to explain the principles of the present disclosure. It is appreciable that the drawings are not necessarily to scale, as some components may be shown to be out of proportion to size in actual implementation in order to clearly illustrate the concept of the present disclosure.

DETAILED DESCRIPTION OF PREFERRED EMBODIMENTS

Overview

Various implementations of the present disclosure and related inventive concepts are described below. It should be acknowledged, however, that the present disclosure is not limited to any particular manner of implementation, and that the various embodiments discussed explicitly herein are primarily for purposes of illustration. For example, the various concepts discussed herein may be suitably implemented in a variety of the LED lamp with battery backup user interface.

The present disclosure includes an elongated housing, LED arrays, a rechargeable battery, a controller circuit, two drivers, a charging circuit, and a battery backup user interface. The first driver converts an external power to drive the LED array whereas the second driver draws power from the rechargeable battery to drive the LED array during power outage. The charging circuit charges the rechargeable battery during normal operation. The battery backup user interface includes a battery charging indicator indicating the charging status of the rechargeable battery. The battery backup user interface also includes a battery shutoff switch allowing a user to engage or disengage the rechargeable battery. In some cases, the battery backup user interface further includes a test button allowing the user to trigger a test of the rechargeable battery.

Example Implementations

Figure 1:
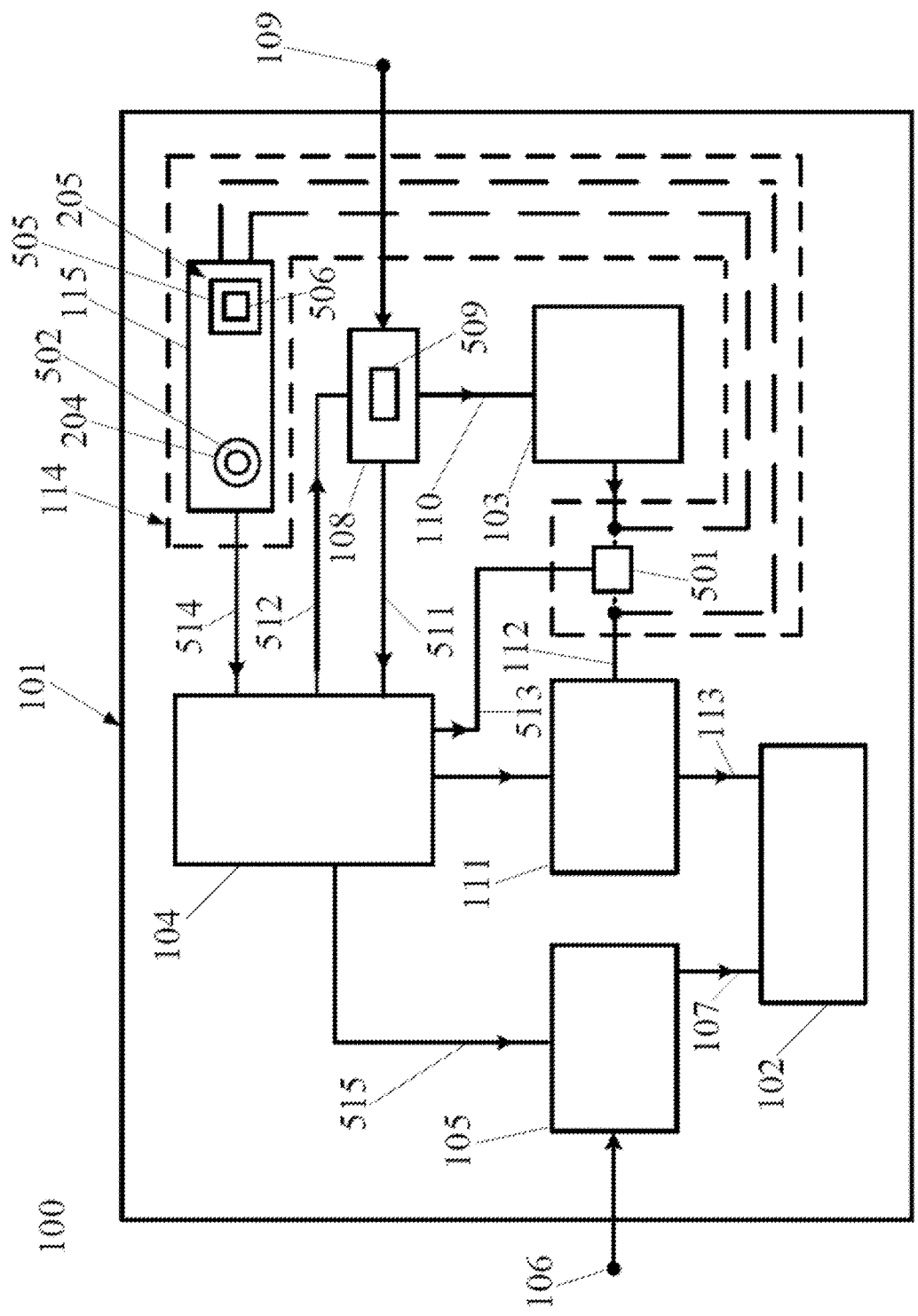
FIG. 1 schematically depicts a first embodiment of the present disclosure.

FIG. 1 schematically depicts an embodiment of the present disclosure 100. The elongated housing 101 houses one or more LED arrays 102, a rechargeable battery 103, a controller circuit 104, a first driver 105, a charging circuit 108, a second driver 111, and a user interface section 114. The first driver 105 converts a first external power 106 to a first internal power 107 for driving the one or more LED arrays 102. The charging circuit 108 converts a second external power 109 to a second internal power 110 for charging the rechargeable battery 103. The second driver 111 draws a third internal power 112 from the rechargeable battery 103 and to convert the third internal power to a fourth internal power 113 for driving the one or more LED arrays 102.

When the second external power 109 is detected, the controller circuit 104 is configured to operate the one or more LED arrays 102 in a normal mode by (1) enabling the charging circuit 108 for charging the rechargeable battery 103, (2) disabling the second driver 111 from drawing the third internal power 112 from the rechargeable battery 103, and (3) enabling the first driver 105 to supply the first internal power 107 to light up the one or more LED arrays 102. When both the second external power 109 and the first external power 106 are not detected, the controller circuit 104 is configured to operate the one or more LED arrays 102 in an emergency mode by enabling the second driver 111 to draw third internal power 112 from the rechargeable battery 103 and to supply the fourth internal power 113 to light up the one or more LED arrays 102. The charging circuit 108 comprises a first battery protection circuit 509 configured to monitor a charging condition, such as a charging voltage and a charging current, and to automatically disable the second internal power 110 to the rechargeable battery 103, preventing the rechargeable battery 103 from being overcharged, creating an overheating situation and a fire hazard. The first battery protection circuit 509 may monitor the charging condition and feed signals of the charging condition to the controller circuit 104 via a first link 511 and may be controlled by the controller circuit 104 via a second link 512.

Figure 2:
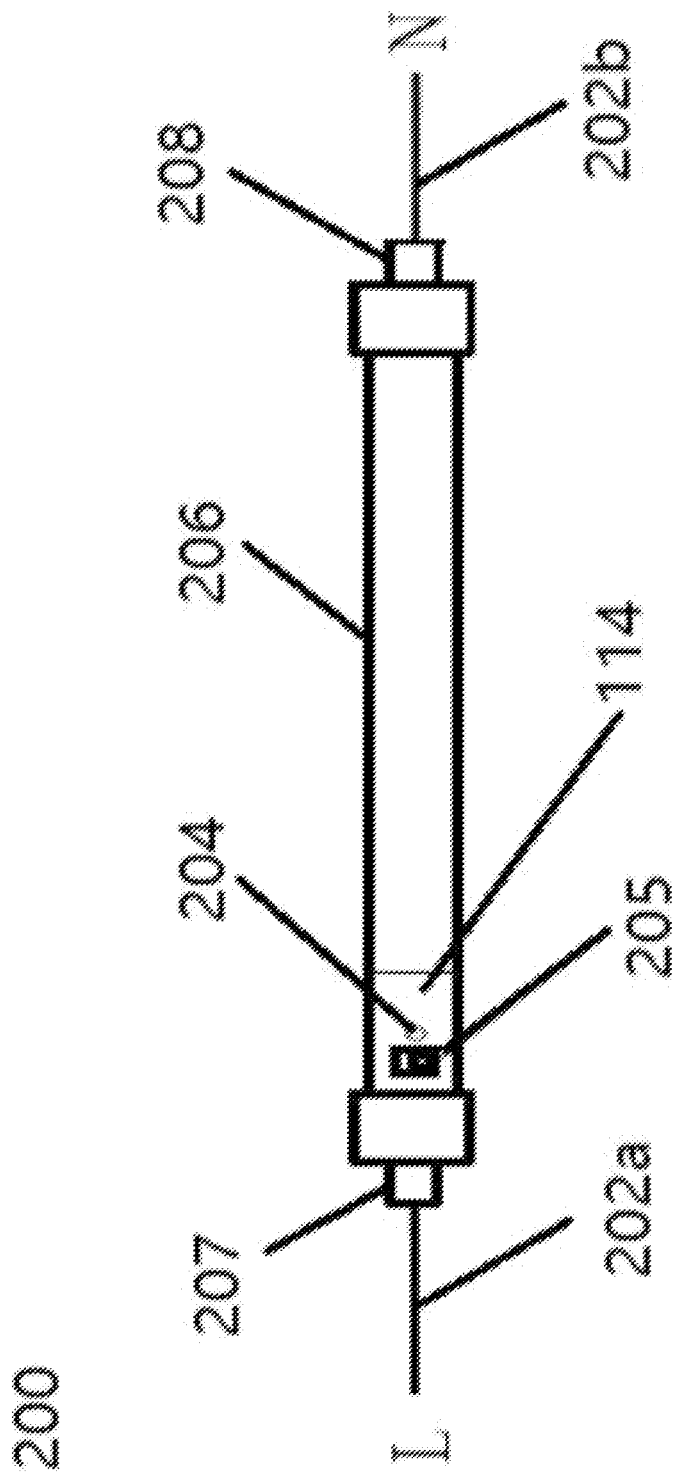
FIG. 2 shows the wiring diagram and an image of the first embodiment.

FIG. 2 shows a wiring diagram and an image of the embodiment 100 with additional information on the exterior appearance of this LED lamp. As can be seen in FIG. 2, a portion of the elongated housing has an elongated translucent lens 206 for a light of the one or more LED arrays 102 to shine through. A user interface section 114 is disposed on an opaque portion of the elongated housing 101 and facing the same first direction as the one or more LED arrays 102. The user interface section 114 includes a first indicator 204 and a battery shutoff mechanism 205, also shown in FIG. 1. The first indicator 204 flickers when the rechargeable battery 103 is being charged. When the rechargeable battery 103 is fully charged, the first indicator 204 will light up without flickering. Therefore, the same indicator 104 serves two functions: showing the battery is being charged by flickering, and showing the battery is fully charged when stopped flickering. The battery shutoff mechanism 205 may comprise a mechanical switch. When the mechanical switch is at the OFF position, an electrical connection between the rechargeable battery 103 and the second driver 111 is off. Shown in FIG. 1, the user interface section 114 further comprises an interface panel 115 and internal wirings (shown in long-dash lines) to implement such an electrical connection. On the other hand, a battery shutoff mechanism may comprise a first signaling device 505. When the first signaling device 505 is triggered by a user, the electrical connection between the rechargeable battery 103 and the second driver 111 is turned off by the controller circuit 104 via an interface device 501. The interface device 501 may be an electronic switch controllable by the controller circuit 104 via a fourth link 513. In this case, the first signaling device 505 is configured to generate one or more electrical pulses in response to triggering by the user and to send such one or more electrical pulses to the controller circuit 104 via a third link 514. The user interface section 114 may further comprise a second signaling device 506 to signal the controller circuit 104 to perform a battery test for a second predefined period. The second signaling device 506 may be integrated into the first signaling device 505 for simplicity. In FIG. 1, the second signaling device 506 is sketched inside the first signaling device 505 to illustrate the idea. The controller circuit 104 may be linked to the first driver 105 via a fifth link 515 to control the first driver 105 to supply the first internal power 107 to drive the one or more LED arrays 102. Such a control may be started at the user interface section 114, where the battery shutoff mechanism 205 may be further configured to turn off the first internal power 107, in addition to turning off the fourth internal power 113 for driving the one or more LED arrays 102. In this case, the battery shutoff mechanism 205 may be a main switch.

The wiring diagram in FIG. 2 shows that there are two electrical contacts on each of the two endcaps 207, 208 extruding out of the elongated housing 101 of the lamp. One pair of electrical contacts 207 are bridged and connected to L 202a, and the other pair of electrical contacts 208 are bridged and connected N 202b. Therefore, effectively, the first external power 106 and the second external power 109 are the same non-switched power source, 202a, 202b. This embodiment may be used for always-on lighting applications where the emergency lamp is on 24×7, e.g., for hallways, stairways, parking garages, and retail stores. In FIG. 1, the user interface section 114 may further comprise a second indicator 502 indicating whether the rechargeable battery 103 is fully charged or not. The second indicator 502 may be logical, not physical, and it may be implemented via one physical indicator, such as the first indicator 204. In FIG. 1, the second indicator 502 is sketched inside the first indicator 204 to illustrate the idea.

Figure 3:
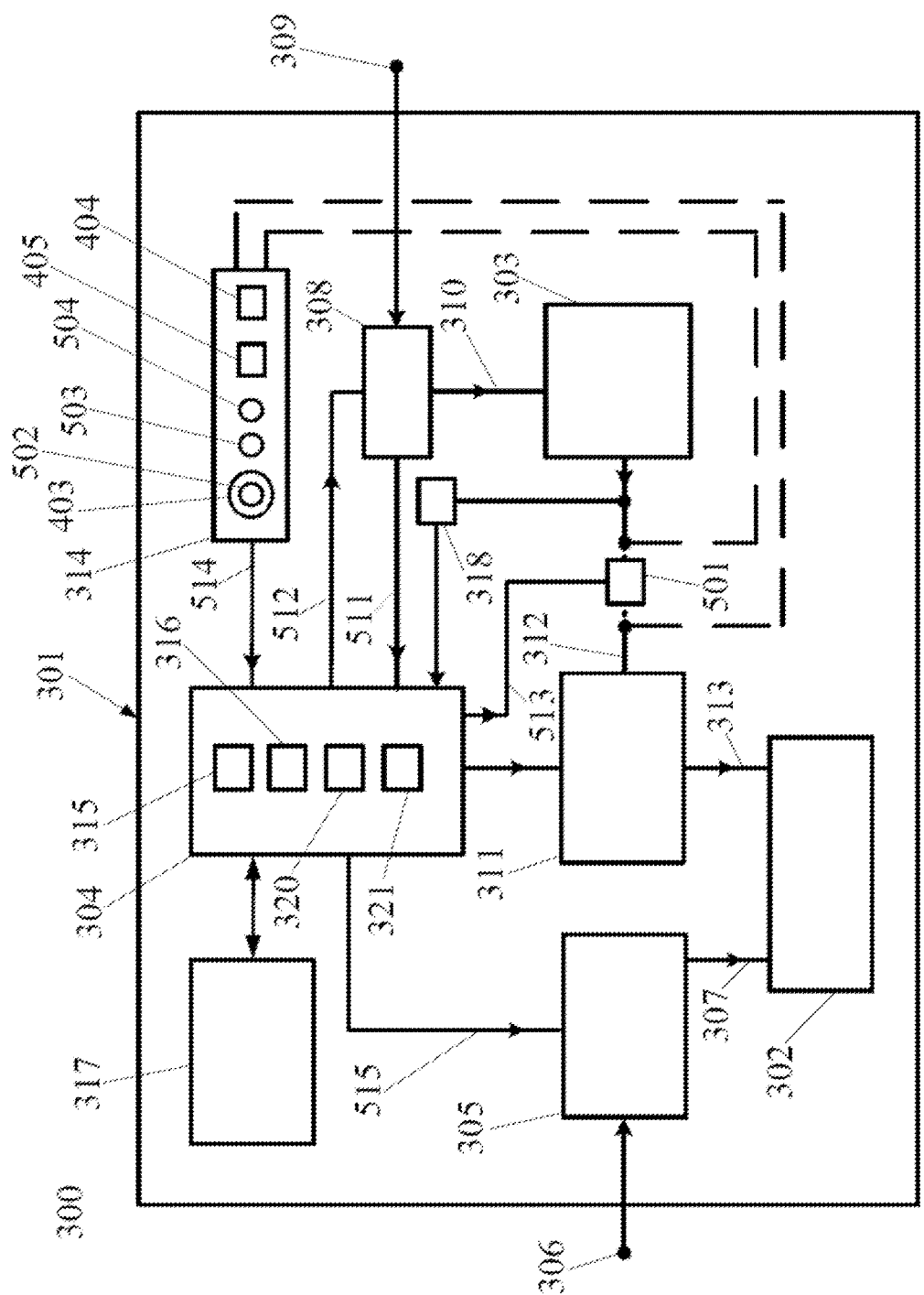
FIG. 3 schematically depicts a second embodiment of the present disclosure.

FIG. 3 schematically depicts another embodiment of the present disclosure 300. The elongated housing 301 houses one or more LED arrays 302, a rechargeable battery 303, a controller circuit 304, a first driver 305, a charging circuit 308, a second driver 311, a user interface section 314, a voltage sensing circuit 318, and a network interface portion 317. The controller circuit 304 further includes a flash memory 315 and a battery 316. The first driver 305 converts a first external power 306 to a first internal power 307 for driving the one or more LED arrays 302. The charging circuit 308 converts a second non-switched (always-on) external power 309 to a second internal power 310 for charging the rechargeable battery 303. The second driver 311 draws a third internal power 312 from the rechargeable battery 303 and to convert the third internal power to a fourth internal power 313 for driving the one or more LED arrays 302.

When the second external power 309 is detected, the controller circuit 304 is configured to operate the one or more LED arrays 302 in a normal mode by (1) enabling the charging circuit 308 to charge the rechargeable battery 303, (2) disabling the second driver 311 to draw the third internal power 312 from the rechargeable battery 303, and (3) enabling the first driver 305 to supply the first internal power 307 to light up the one or more LED arrays 302. When both the second external power 309 and the first external power 306 are not detected, the controller circuit 304 is configured to operate the one or more LED arrays 302 in an emergency mode by enabling the second driver 311 to draw third internal power 312 from the rechargeable battery 303 and to supply the fourth internal power 313 to light up the one or more LED arrays 302. The voltage sensing circuit 318 is configured to sense the terminal voltage of the rechargeable battery 303.

Figure 4:
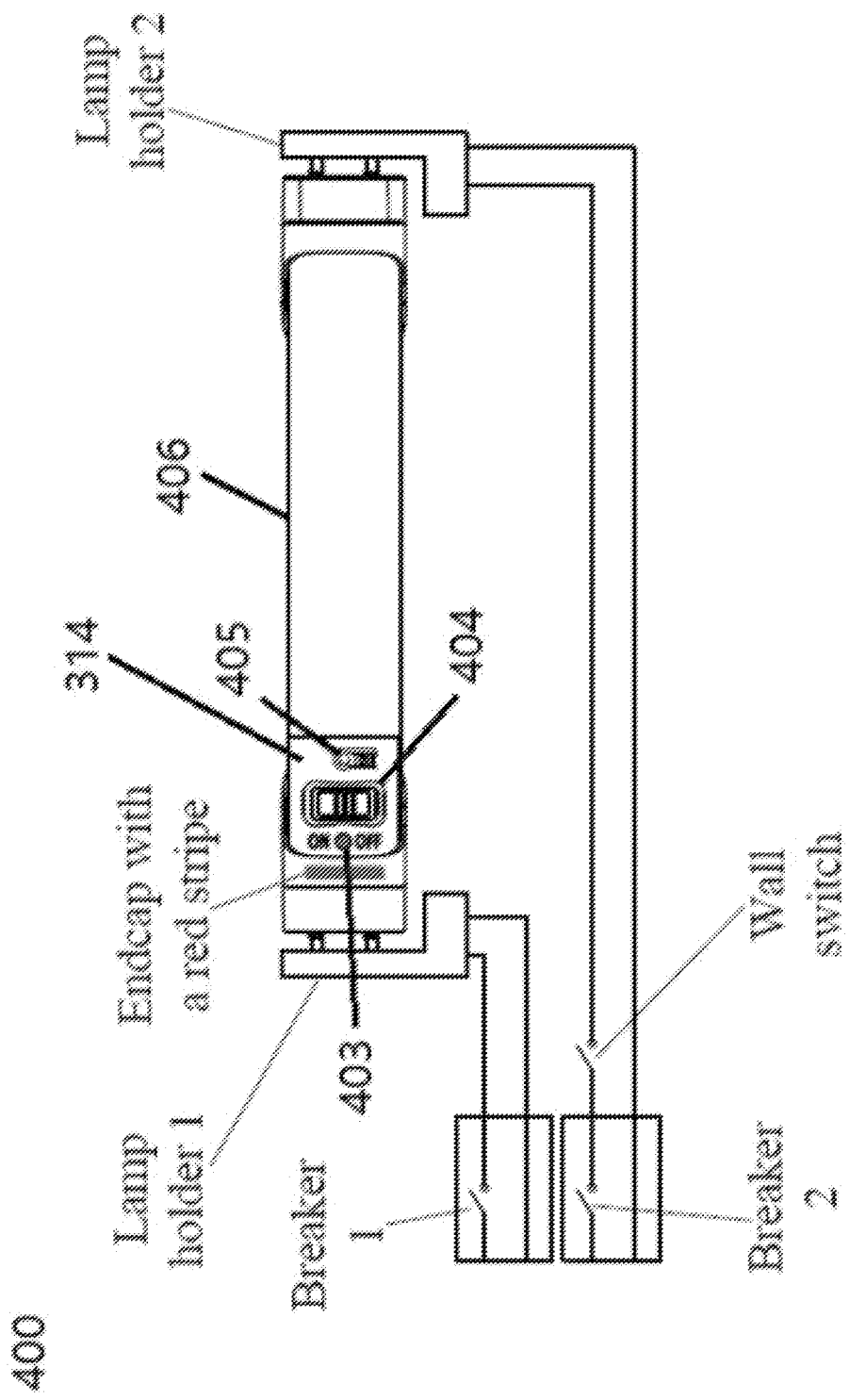
FIG. 4 shows the wiring diagram and an image of the second embodiment.

FIG. 4 shows a wiring diagram and an image of the embodiment 300 with additional information on the exterior appearance of this LED lamp. As can be seen in FIG. 4, a portion of the elongated housing comprises an elongated translucent lens 406 for a light of the one or more LED arrays 302 to shine through. A user interface section 314 is disposed on an opaque portion of the elongated housing 301 and facing the same first direction as the one or more LED arrays 302. The user interface section 314 includes a first indicator 403, a battery shutoff switch 404, a third indicator 503, and a test button 405. The first indicator 403 is on when the rechargeable battery 303 is being charged or fully charged (i.e., it doesn't distinguish that the battery is being charged from that the battery is fully charged). The battery shutoff switch 404 is a mechanical switch. When the battery shutoff switch 404 is at the OFF position, the electrical connection between the rechargeable battery 303 and the second driver 311 is off. When the terminal voltage of the rechargeable battery 303 drops below a predefined percentage relative to a nominal voltage during the battery test mode, the controller circuit 304 sets off the third indicator 503 indicating the battery test failed, exits out of the battery test mode, and resumes an operation of the normal mode. In FIG. 3, the battery shutoff switch 404 may be a toggle switch. When such a toggle switch is depressed, the controller circuit 304 receives a signal and controls an electronic switch 501 to make an electrical connection between the rechargeable battery 303 and the second driver 311. The user interface section 314 may further comprise a fourth indicator 504 indicating the one or more LED arrays 302 are operated in the battery test mode.

Referring to FIG. 3, when the test button 405 is depressed, the controller circuit 304 is configured to operate the one or more LED arrays 302 in a battery test mode for 30 seconds by: (1) disabling the first driver 305 to supply the first internal power 307 to the one or more LED arrays 302, (2) disabling the charging circuit 308 to provide the second internal power 310 to the rechargeable battery 303, (3) enabling the second driver 311 to draw the third internal power 312 from the rechargeable battery 303, (4) enabling the second driver to supply the fourth internal power 313 to light up the one or more LED arrays 302, and (5) sampling the terminal voltage of the rechargeable battery 303 via the voltage sensing circuit 318. During the battery test mode, the first indicator 403 will flicker every 2 seconds, informing a user that the lamp is undergoing a battery test. If the terminal voltage of the rechargeable battery 303 drops below 50% (for example) relative to a nominal voltage during the battery test mode, the controller circuit 304 will exit out of the battery test mode, resume an operation of the normal mode, and instruct the first indicator 403 to flicker every 0.5 second. If the test button 405 is depressed twice in two seconds, the controller circuit 304 will perform a 90-minute (90-min) battery test, instead of the 30-sec battery test described above.

It is worth noting that the first indicator 403 serves three functions. Firstly, when the first indicator is fully on, the battery is being charged or fully charged. Secondly, when the first indicator is flickering every 2 seconds, the lamp is undergoing a battery test mode. Thirdly, when the first indicator is flickering every 0.5 second, the last battery test has failed. The battery 316 is equipped to power an operation of the controller circuit 304 during the battery test mode and/or during power outage when the first external power 306 and the second external power 309 are off.

The controller circuit 304 can perform the battery test mode according to two schedules. For the first schedule, the controller circuit 304 will perform the 30-sec battery test every 30 days. For the second schedule, the controller circuit 304 will perform the 90-min battery test every 365 days. These two test schedules meet the audit test requirements according to the UL 924 emergency lighting standards.

The controller circuit 304 will start its internal clock for enforcing these two schedules after the LED lamp is installed and activated for 48 hours. The 48-hour delay is intentional and helps to prevent mis-firing the battery test schedules when the LED lamp is going through multiple short on/off cycles during installation and testing. However, the default 48-hour delay on the start time of the two battery test schedules doesn't affect the time of the date when the battery tests will begin. For example, if the LED lamp is installed and activated at 10 am, then the battery tests in the future will begin at 10 am. However, 10 am is during the normal business hours and may not a good time to perform the battery test. A user may prefer to have the battery test performed during off hours, such as 10 pm. To support this operation, the controller circuit 304 may comprise an internal clock 321 and a reset mechanism to reset the starting time of the at least one predefined schedule by depressing the test button 405 three times in two seconds at 10 pm.

It is worth noting that the test button 405 serves three functions. Firstly, when the test button 405 is depressed once in two seconds, the controller circuit 304 will perform the 30-sec battery test. Secondly, when the test button 405 is depressed twice in two seconds, the controller circuit 304 will perform the 90-min battery test. Thirdly, when the test button 405 is depressed three times in two seconds, it will reset the starting time of the two battery test schedules.

The controller circuit 304 is configured to store the last 20 battery test results in the flash memory 315. The flash memory 315 is used so that even there is an extended power outage and the second rechargeable battery 316 is also drained, the past battery test results stored in the flash memory 315 will not be lost. The controller circuit 304 may further comprise a second battery protection circuit 320 configured to automatically disable the third internal power 112 to convert into the fourth internal power 113, driving the one or more LED arrays 302, thereby preventing the rechargeable battery 303 from being over-discharged for battery longevity.

The network interface portion 317 connects wirelessly via Wi-Fi to a remote device for reporting the battery test results upon an inquiry from the remote device. An advanced version of the controller circuit 304 implemented via a microprocessor may support remote battery test commands such as performing the 30-second or the 90-min battery test on demand and reporting the battery test results back to the remote device.

The wiring diagram in FIG. 4 shows that there are two electrical contacts on each of the two ends extruding out of the elongated housing 301 of the LED lamp. One pair of electrical contacts situated on the lamp holder 1 are connected to a non-switched external power 309 for charging the battery 303 through the charging circuit 308. The other pair of electrical contacts situated on the lamp holder 2 are connected to a switched external power 306 controlled by a wall switch. When a user turns off the wall switch, the first driver 305 would not supply any power to the one or more LED arrays 302, and this would not affect the charging circuit 308 from charging the rechargeable battery 303. Such a battery backup LED lamp is ideal for offices and classrooms where the lamp may be turned off at night for energy savings. During power outages, it can provide emergency lighting with the power from the rechargeable battery 303.

Additional and Alternative Implementation Notes

Although the techniques have been described in language specific to certain applications, it is to be understood that the appended claims are not necessarily limited to the specific features or applications described herein. Rather, the specific features and examples are disclosed as non-limiting exemplary forms of implementing such techniques. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

What is claimed is:

1. A light-emitting diode (LED) lamp, comprising:
    an elongated housing;
    one or more LED arrays, facing a first direction;
    a rechargeable battery;
    a controller circuit;
    a first driver configured to convert a first external power to a first internal power to drive the one or more LED arrays in a normal mode;
    a charging circuit configured to convert a second external power to a second internal power to charge the rechargeable battery;
    a second driver configured to draw a third internal power from the rechargeable battery and to convert the third internal power to a fourth internal power to drive the one or more LED arrays in an emergency mode; and
    a user interface section disposed on an opaque portion of the elongated housing and facing the first direction,
    wherein:
        a portion of the elongated housing comprises either a translucent or a transparent lens to allow a light emitted from the one or more LED arrays to shine through;
        the charging circuit comprises a first battery protection circuit configured to monitor a charging condition and to automatically disable the second internal power to the rechargeable battery, thereby preventing the rechargeable battery from being overcharged or creating a fire hazard;
        when the second external power is detected, the controller circuit is configured to operate the one or more LED arrays in the normal mode by (1) enabling the charging circuit to charge the rechargeable battery, (2) disabling the second driver to draw the third internal power from the rechargeable battery, and (3) enabling the first driver to supply the first internal power to light up the one or more LED arrays;
        when the second external power is not detected, the controller circuit is configured to operate the one or more LED arrays in the emergency mode by enabling the second driver to draw the third internal power from the rechargeable battery and to supply the fourth internal power to light up the one or more LED arrays; and
        the user interface section comprises:
            a first indicator configured to indicate whether the rechargeable battery is being charged or not; and
            a battery shutoff mechanism configured to disable the rechargeable battery to provide the third internal power to the second driver.

2. The light-emitting diode (LED) lamp of claim 1, wherein each of the first external power and the second external power comprises a non-switched power source.

3. The light-emitting diode (LED) lamp of claim 2, wherein the non-switched power source is connected to a pair of electrical contacts extruding out of one end of the elongated housing.

4. The light-emitting diode (LED) lamp of claim 2, wherein the non-switched power source is connected between a first pair of electrical contacts extruding out of one end of the elongated housing and a second pair of electrical contacts extruding out of an opposite end of the elongated housing.

5. The light-emitting diode (LED) lamp of claim 1, wherein the first external power is a switched power source connected to a first pair of electrical contacts extruding out of one end of the elongated housing, and wherein the second external power is a non-switched external power source connected to a second pair of electrical contacts extruding out of an opposite end of the elongated housing.

6. The light-emitting diode (LED) lamp of claim 1, wherein the user interface section further comprises a second indicator configured to indicate whether the rechargeable battery is fully charged or not.

7. The light-emitting diode (LED) lamp of claim 6, wherein the second indicator is a logical type and integrated in the first indicator.

8. The light-emitting diode (LED) lamp of claim 1, wherein the battery shutoff mechanism comprises a mechanical switch, and wherein, when the mechanical shutoff switch is turned off, an electrical connection between the rechargeable battery and the second driver is turned off.

9. The light-emitting diode (LED) lamp of claim 1, wherein the battery shutoff mechanism comprises a first signaling device, and wherein, when the first signaling device is triggered by a user, an electrical connection between the rechargeable battery and the second driver is turned off.

10. The light-emitting diode (LED) lamp of claim 9, wherein the first signaling device is configured to generate one or more electrical pulses in response to triggering by the user.

11. The light-emitting diode (LED) lamp of claim 10, wherein the user interface section further comprises a second signaling device configured to signal the controller circuit to perform a battery test for a predefined period.

12. The light-emitting diode (LED) lamp of claim 1, wherein the first battery protection circuit is configured to continuously monitor a charging voltage and a charging current and to feed the charging voltage and the charging current to the controller circuit via a first link, and wherein the charging circuit is controlled by the controller circuit via a second link.

13. The light-emitting diode (LED) lamp of claim 1, wherein the user interface section is further configured to turn off the first internal power, and wherein the battery shutoff mechanism further functions as a main switch.

14. The light-emitting diode (LED) lamp of claim 10, wherein the user interface section further comprises an interface device, and wherein the second driver is turned off by the controller circuit via the interface device.

15. The light-emitting diode (LED) lamp of claim 14, wherein the interface device is an electronic switch controllable by the controller circuit via a fourth link.

16. The light-emitting diode (LED) lamp of claim 1, wherein:
the LED lamp further comprises a voltage sensing circuit configured to sense a terminal voltage of the rechargeable battery; and
the user interface section further comprises a test button and a third indicator,
wherein:
when the test button is depressed, the controller circuit is configured to operate the one or more LED arrays in a battery test mode for a first predefined period by: (1) disabling the first driver to supply the first internal power to the one or more LED arrays, (2) disabling the charging circuit to provide the second internal power to the rechargeable battery, (3) enabling the second driver to draw the third internal power from the rechargeable battery, (4) enabling the second driver to supply the fourth internal power to light up the one or more LED arrays, and (5) sampling a portion of the terminal voltage of the rechargeable battery via the voltage sensing circuit; and
in an event that the terminal voltage of the rechargeable battery drops below a predefined percentage relative to a nominal voltage during the battery test mode, the controller circuit is configured to set off the third indicator to indicate the battery test having failed exit out of the battery test mode, and resume an operation in the normal mode.

17. The light-emitting diode (LED) lamp of claim 16, wherein the user interface section further comprises a fourth indicator configured to indicate that the one or more LED arrays are operated in the battery test mode.

18. The light-emitting diode (LED) lamp of claim 16, wherein the controller circuit further comprises a memory portion configured to store a result from a most recent battery test.

19. The light-emitting diode (LED) lamp of claim 16, wherein the controller circuit is further configured to perform the battery test periodically and automatically according to at least one predefined schedule and an internal clock in the controller circuit.

20. The light-emitting diode (LED) lamp of 19, wherein the controller circuit further comprises a reset mechanism to reset a starting time of the at least one predefined schedule.

21. The light-emitting diode (LED) lamp of claim 16, further comprising a network interface portion configured to operate in conjunction with the controller circuit to (1) report a result from a most recent battery test to either a remote device or a remote system, or (2) receive and execute a battery test request from either the remote device or the remote system and report the result from the most recent battery test back to the remote device or the remote system, or (3) perform both (1) and (2).

22. The light-emitting diode (LED) lamp of claim 21, wherein the network interface portion is configured to communicate with either the remote device or the remote system via a wireless communication comprising Wi-Fi, Bluetooth, infrared (IR), or visible light communication (VLC).

23. The light-emitting diode (LED) lamp of claim 21, wherein the network interface portion is configured to communicate with either the remote device or the remote system via a wired communication comprising Power over Ethernet (POE).

24. The light-emitting diode (LED) lamp of claim 16, wherein the controller circuit further comprises a second battery protection circuit configured to automatically disable the third internal power to convert into the fourth internal power to drive the one or more LED arrays, thereby preventing the rechargeable battery from being over-discharged.

* * * * *